United States Patent
Busch

(10) Patent No.: US 7,155,247 B2
(45) Date of Patent: Dec. 26, 2006

(54) WIRELESS COMMUNICATION NETWORK WITH AUTOMATIC THRESHOLD ADJUSTMENT

(75) Inventor: Patrick Busch, Veldhoven (NL)

(73) Assignee: Lucent Technologies Inc., Murray Hill, NJ (US)

( * ) Notice: Subject to any disclaimer, the term of this patent is extended or adjusted under 35 U.S.C. 154(b) by 550 days.

(21) Appl. No.: 10/410,471

(22) Filed: Apr. 9, 2003

(65) Prior Publication Data

US 2003/0199283 A1   Oct. 23, 2003

(30) Foreign Application Priority Data

Apr. 23, 2002   (GB)   ................. 0209268.2

(51) Int. Cl.
*H04B 7/00*   (2006.01)
*H04Q 7/20*   (2006.01)

(52) U.S. Cl. .............. 455/513; 455/509; 455/502; 455/522

(58) Field of Classification Search ........... 455/513, 455/509, 502, 500, 522, 450, 452.1, 453; 370/241, 338

See application file for complete search history.

(56) References Cited

U.S. PATENT DOCUMENTS

2003/0179708 A1 *   9/2003   Kamerman et al. ......... 370/241

FOREIGN PATENT DOCUMENTS

EP   0 474 489 A2 *   3/1992
EP   1 107 628 A2 *   6/2001

OTHER PUBLICATIONS

"Dynamic Access Point Approach (DAPA) for IEEE 802.11 Wireless LANs" Shiann-Tsong Sheu et al, 0-78035435-4/99 IEEE 1999.*

* cited by examiner

*Primary Examiner*—Edan Orgad

(57) ABSTRACT

A wireless communication network contains a plurality of spatially distributed communication devices (access point devices and station devices) for exchanging wireless signal frames. A device processes signal frames only when a strength of the signals exceeds a carrier detection threshold. Devices defer an intended transmission upon detection of a wireless signal with a strength greater than a defer threshold prior to the intended transmission. A measuring circuit performs a first measurement of a first signal strength of signals from access point devices and a second measurement of a second signal strength of signals from station devices associated with a first one of the access point devices. A threshold adjustment circuit first sets the carrier detection threshold of a first one of the access point devices above the first signal strength. The second measurement is performed when said first setting has taken effect. The threshold adjustment circuit subsequently setting the defer threshold of the first one of the access point devices and/or one or more of the station devices associated with the first one of the access point devices below the second signal strength.

11 Claims, 2 Drawing Sheets

WIRELESS COMMUNICATION NETWORK WITH AUTOMATIC THRESHOLD ADJUSTMENT

CROSS REFERENCE TO RELATED APPLICATION

This application claims priority of Great Britain Application No. 0209268.2 filed on Apr. 23, 2003.

FIELD OF THE INVENTIO

The invention relates to a wireless communication network, a station for use in a wireless communication network and a method of operating such a network.

BACKGROUND ART

European Patent Application No. EP 903891 discloses a wireless communication network. The network allows devices to exchange messages (called frames) by wireless communication.

The network is organized as a group of cells. Each cell contains one device called an access point. Other devices, called stations, dynamically associate themselves with the cells. Each station selects one of the access points with which the station is able to communicate and associates itself with the selected access point. Subsequently the stations in a cell communicate with the access point of the cell with which they are associated, but not directly with each other or with the access points of other cells.

The network uses various measures to allow a plurality of cells to operate in parallel and to allow a plurality of stations to operate in a cell. First of all, each cell operates with frames carried by signals with frequencies in its own frequency channel. Spatially adjacent or overlapping cells generally use different frequency channels to minimize interference between the cells, but since only a limited number of frequency channels is available some cells will inevitably use the same frequency channels.

Secondly, the devices monitor the signal strength of incoming signals. The devices process frames from the received signals only when the strength of the signals is above a first threshold (the Carrier Detect Threshold or CDT). The CDT discriminates against signals from devices in other cells than the cell to which the receiving device belongs. Thus, the devices in a cell are not unnecessarily occupied by frames from other cells, leaving the devices ready to receive frames from their own cell.

Thirdly each device monitors the strength of received wireless signals before it transmits a frame itself. The device defers transmission of the frame as long as the strength of the received signals is above a second threshold (the Defer Threshold or DT). The DT is designed to ensure that the device does not start transmission while another device in the cell is busy transmitting a frame. In the past the DT was preferably selected to be somewhat lower than the CDT, to ensure that a device will not start transmission during transmission of a frame that is recognized to be above the CDT by other devices in the cell.

Selection of the CDT effectively determines cell size. The devices in a cell are deaf to frames from other cells that are so far away that their signals are attenuated to a level below the CDT before these signals reach devices in the cell. EP 903891 discloses some criteria for setting the DT and CDT in terms of curves that relate the distance between stations to signal strength. This publication does not disclose by which means these thresholds are set, but in practice the thresholds are set manually when the access points of the network are installed. The CDT is set according to the distance to adjacent cells in the network and the DT is set relative to the CDT. Such a manual selection of the thresholds is inconvenient and moreover prone to be sub-optimal, particularly when existing thresholds are not updated after changes to the network such as the removal or addition of stations.

SUMMARY OF THE INVENTION

Amongst others, it is an object of the invention to provide for automatic dynamical adjustment of the thresholds used in a wireless communication system.

According to the invention the devices in the network set the CDT and the DT dynamically, on the basis of different measurements respectively. The CDT of a device in a cell is set above a measured signal strength of devices in other cells. Thus, available cell size is adapted to the distance between different cells with the CDT. Once the association of devices has adapted to the selected CDT value, a second measurement is made of the signal strength of devices in the cell that is defined in this way. From this measurement the DT for a device in the cell is determined. This reflects the size of the part of the cell that is effectively used. If the station devices in the cell are all in a part of the cell that is close to the access point device, the DT will be much higher than when the devices are spread over the entire cell.

The device will change the CDT generally only when new access points are added or removed, but the DT may generally be changed each time when a station is added or removed or when a station moves.

Preferably both measurements are performed at the location of the access point device of the cell to get a representative measurement, but in principle the measurements could be performed elsewhere, for example by a representative station device. Preferably, the access point device communicates information about the measurements to the station devices of the cell, so that the station devices can use the measurements to set their own thresholds. Thus only a single set of measurements is needed to set the thresholds of all devices in the cell.

Preferably, at least the measurements for setting the DT and the setting of DT are periodically repeated (although not necessarily each time after the same time interval). This allows the network to adapt to the addition of station devices to the cells or the removal of station devices or to movement of the stations.

Preferably, the measurements needed for setting the CDT and setting the CDT itself are also periodically repeated. Generally this may be done at a lower frequency than updating the DT, since the CDT depends only on the location of access point devices. The measurements for setting the CDT may be performed on probe transactions with the access point devices, each time using the frequency channel of the access point device involved. In embodiment, however, only measurements on a selected subset of the access point devices are used, the access point devices being selected according to the frequency channel used by the access point device. Preferably measurements of signal strength of access point devices that use frequency channels that are more distant from the frequency channel of the cell of which the CDT is set are not used to set the CDT. For example only measurements may be used of signal strength of access point devices that use the same channel and immediately adjacent channels as the frequency channel of the cell of which the CDT is set. In any case (not only in this embodiment), the CDT is preferably determined from the maximum of the measured signal strengths, after a correction factor has been applied according to the distance between the channels. Thus, it is prevented that the CDT is set to an unnecessary high value, due to signal strength of access point devices that operate in different channels. It should be appreciated that this technique can be applied independent of whether the DT is set automatically, but in combination with setting of the DT, which depends only on in-channel signal strength, this allows for a more robust setting of the thresholds.

BRIEF DESCRIPTION OF THE DRAWINGS

These and other objects and advantageous aspects of the system, method and devices according to the invention will be described in more detail using the following drawing.

DETAILED DESCRIPTION

Figure 1:
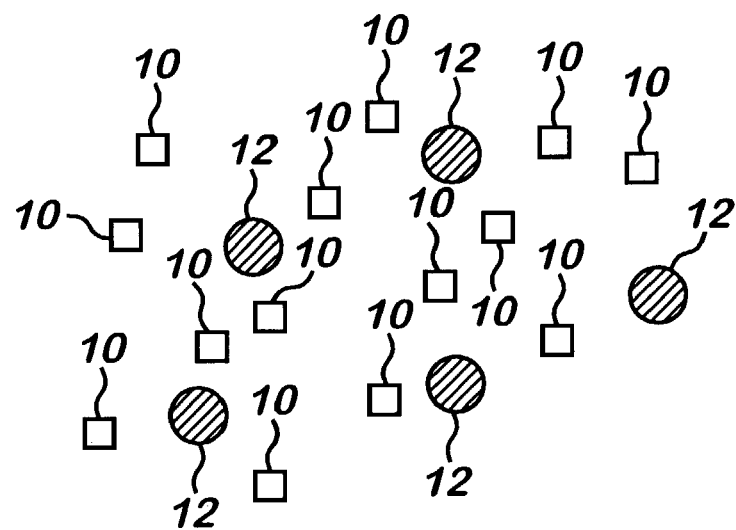
FIG. 1 shows a spatial arrangement of devices in a wireless network.

FIG. 1 shows a spatial arrangement of devices 10, 12 in a wireless network. In a wireless network devices 10, 12 communicate with each other with wireless signals, preferably electromagnetic signals such as modulated microwave signals or infrared signals, but other types of signals, such as acoustic signals may be used as well. In a wireless network the spatial placement of the devices relative to one another determines the attenuation with which signals from one device 10, 12 reach another device 10, 12.

During operation the devices 10, 12 organize themselves into cells. The devices include access points devices 12 and station devices 10. Each access point device 12 gives rise to a different cell. Each station device 10 is dynamically assigned to an access point device 12. All communication with a station device 10 occurs via the access point device 12 to which the station device 10 is assigned. The devices 10, 12 and their operation will be discussed only as far as needed to understand the invention. Further details of an example of the devices and their operation can be found in European patent application No. 1156623 and its references.

Figure 2:
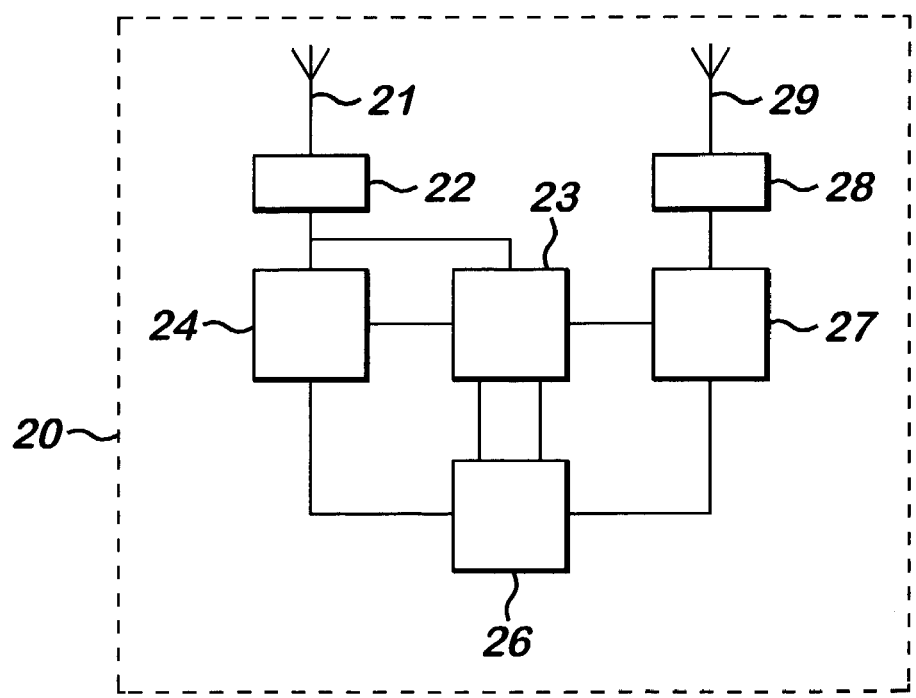
FIG. 2 shows a device for use in a wireless network.

FIG. 2 shows an example of a device 20. The example applies to access point devices 12 as well as station devices 10. Device 20 contains a reception input 21 for wireless signals, a receiving circuit 22, a signal strength discriminator 22, a frame extractor circuit 24, a processing circuit 26, a frame insertion circuit 27, a transmitter circuit for wireless signals 28 and a transmission output 29 for wireless signals. The reception input 21 is coupled to the receiving circuit 22, which has an output coupled to the strength discriminator 22 and the frame extractor circuit 24. The strength discriminator has control outputs coupled to the frame extractor 24 and the frame insertion circuit 27. The processing circuit 26 has an input coupled to the frame extractor 24, an output coupled to the frame insertion circuit 27 and a threshold selection interface to strength discriminator 23. The frame insertion circuit is coupled to transmission output 29 via transmitter circuit 28.

In operation device 20 receives wireless signals at reception input 21. Receiving circuit 22 pre-processes the received signals, for example by amplifying the signal and filtering out signals outside a frequency band of the cell to which the signal belongs; receiving circuit 22 may also convert the signal to a lower frequency. Frame extractor 24 extracts information from frames that are modulated onto the signals from receiving circuit 22 and passes the extracted information to processing circuit 26. Frame extractor does so only when enabled to do so by strength discriminator 23.

Processing circuit 26 process the received information and generates further information for transmission. Processing circuit 26 supplies the further information to frame insertion circuit 27, which generates a signal carrying a frame with the further information and supplies this signal to transmitter circuit 28. Frame insertion only does so when enabled to do so by strength discriminator 23.

Strength discriminator 23 determines when signals with frames must be received or transmitted. Strength discriminator 23 determines the signal strength of the signal at the output of receiving circuit 22. Strength discriminator 23 is arranged to compare the signal with at least two threshold values: the Carrier Detect Threshold (CDT) and the Defer Threshold (DT). The CDT and the DT are used to determine when signals with frames must be received or transmitted respectively. Strength discriminator may continuously compare the strength of the received signal with the CDT and DT, but it will be appreciated that this is not essential: it suffices that the signal be compared with the relevant threshold when needed to decide about reception and transmission respectively.

When an incoming signal has a strength greater than the CDT strength discriminator 23 enables frame extractor 24 to extract a frame from the signal. Generally, the frame carries a destination address. Device 20 verifies whether the destination address is an address of the device, the information from the frame is processed. If the frame is not destined for device 20, the information is not processed. It will be appreciated that the information cannot be processed anyway if the strength of the signal is below the CDT.

Transmission of signals by the device is enabled only when strength discriminator 23 indicates that the received signal, if any has a strength below the DT. Thus, the device aims to prevent transmission while another device is busy transmitting so that the transmission of the other device is not disturbed and conversely that the transmission of the other device does not disturb the transmission of the device. When processing circuit 26 has generated information for transmission, signal inserting circuit 27 defers generation of a signal carrying a frame with the information until strength discriminator 23 indicates that no signal is received with a strength above DT.

The thresholds, CDT and DT, are set automatically by the devices 10, 12 in the system. Preferably, this is controlled by the access point devices 12. First the CDT is set. In order to do so the access point device lowers its CDT to the minimal possible level and attempts to receive signals with frames from other access point devices 12. This may be realized by sending probe request signals from the access point device 12 to potential other access point devices 12 and monitoring the strength of resulting probe response signals, if any, at the output of receiving circuit 22 and/or by monitoring the strength of beacon frames broadcast by the other access point devices 12, if any. Processing circuit 26 may be used to control transmission of probe request signals, strength discriminator 23 may be used to sample the strength of the resulting signal and processing circuit 26 may store the sampled strengths of the signals from the other access points 12.

Figure 3:
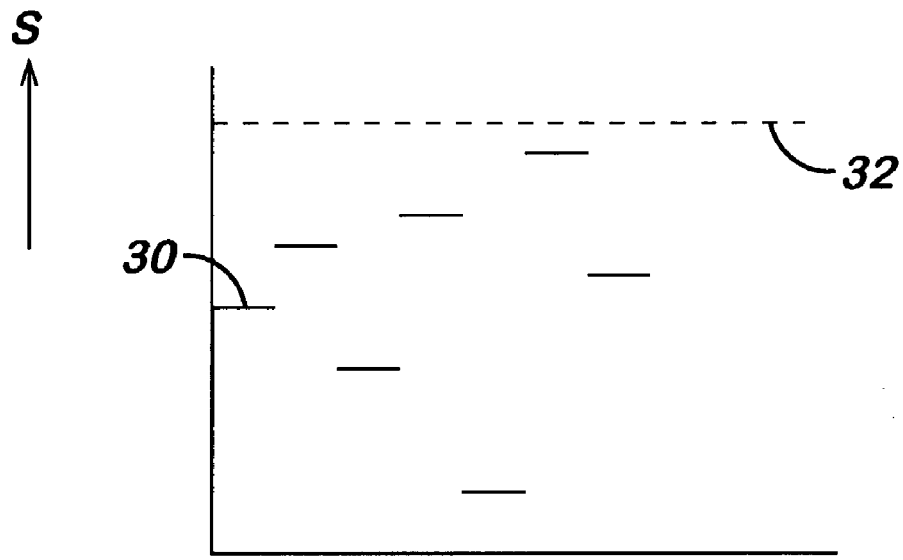
FIG. 3 shows a graph of signal strengths.

FIG. 3 shows a collection of signal levels (e.g. 30) of different access point devices 12 plotted horizontally, with the measured received signal strength of each of the access point devices 12 plotted vertically. The measured strength varies at least as a result of differences between the distances between the measuring device and each of the other access point devices 12.

The access point device 12 (using the processing circuit 24 for example) determines the maximum signal strength among the strengths 30 received from other access point devices 12 and selects a level 32 for the CDT relative to this maximum signal strength, for example a predetermined factor above the maximum measured signal strength. The access point device 12 signals its discriminator circuit 23 to set its CDT accordingly. As a result the access point device 12 will only process signals above the selected CDT.

In principle signal strengths of the other access point devices 12 may be measured by sending probe request signals in the frequency channels of all of the access point devices 12 and measuring the strength of the signal received in the frequency channel used by the other access point device 12 (the receiving circuit 22 is preferably set to that channel to make it possible to identify the received signal). In that case, the measured signal strengths are preferably corrected, each according to the attenuation that would occur when it would be received with receiving circuit 22 tuned to the frequency channel that is normally used by access point device 12 that is selecting its CDT. Of course, instead of using the normal operating frequency channels of the access point devices, transmissions in any other channels may be used to measure the signal strength of these devices, provided the attenuation factor is chosen according to the channels that will normally be used for communication with station devices.

Preferably probe request signals are sent and signal strengths are measured only for other access point devices 12 that normally use the same frequency channel as the access point device 12 that is selecting its CDT, or only for other access point devices 12 that normally use frequency channel within a predetermined distance from the frequency channel normally used by the access point device 12 that is selecting its CDT, for example only those that use immediately adjacent frequency channels.

Station devices 10 initially detect signals from access point devices 10 and each station device 10 attempt to associate with one of the access point devices 12. Successful association results in that the station device 10 subsequently transmits signals in the frequency channel used by the associated access point device 12. The access point device 12 recognizes signals from the associated station device 10 and the station device subsequently transmits frames destined for the associated access point device only, and processes frames from the associated access point device only. Methods of selecting an access point device for this purpose and for implementing association are known per se. Any method may be used.

The station devices 10 transmit signals with a predetermined signal strength. As a result the level of the CDT effectively defines a region of space from which station devices are capable of transmitting signals so that these signals will be received with sufficient strength to be processed by access point device 12. Only station devices 10 within the region of space defined automatically by the access point device 12 are able to associate with the access point device.

Thus, as a result of the selection of the CDT and subsequent association a number of station devices 10 (possibly zero, one, two or more) will be associated with each access point device 12. The access point devices 12 use signals from the associated station devices 10 to select the DT. An access point device measures the strength of signals from station devices at the output of receiving circuit 22. Processing circuit 26 may be used to control selection of measured strengths it may store the measured strengths of the signals from the station devices.

Figure 4:
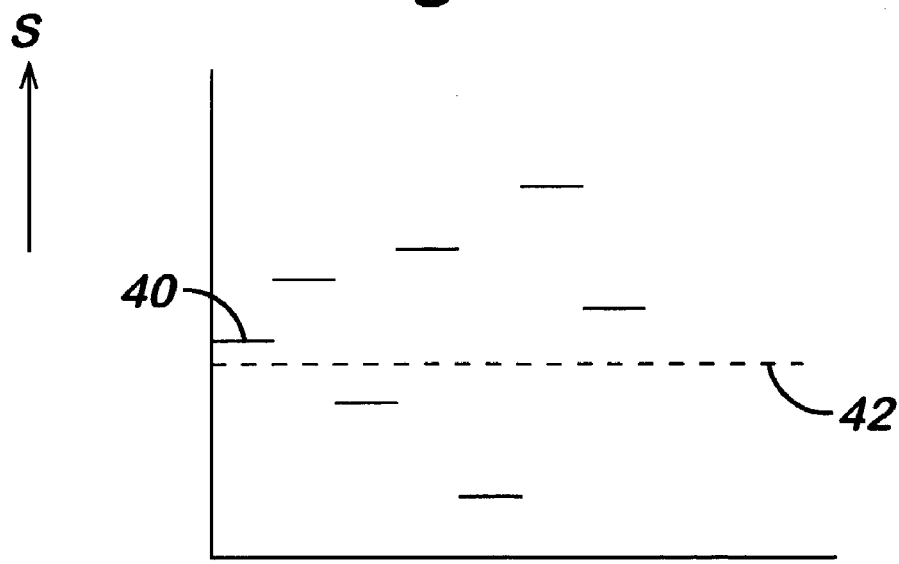
FIG. 4 shows a graph of signal strengths.

FIG. 4 shows a collection of signal levels (e.g. 40) of different station devices 10 measured by an access point device 12 plotted horizontally, with the measured received signal strength of each of station devices 10 plotted vertically. The figure shows signal strengths both from associated station devices 10 and not-associated station devices 10. In principle as, a first step, the extractor circuit 24 of the access point device 12 extracts frames from all stations that have a signal strength above the CDT (although normally only frames from associated station devices 10 are processed further). The measured strengths vary at least as a result of differences between the distances between the measuring device and each of the station devices 10.

The access point device 12 (using the processing circuit 24 for example), as a second step, determines the DT form the strengths 30 received from those of the station devices 10 that are currently associated with the access point device 12. This may be done by determining the minimum of the strengths of signals from those station devices and selects a level 42 for the DT relative to this minimum signal strength, for example a predetermined factor below the minimum measured signal strength. As another example, an average of the signal strengths from those station devices 10 may be used as DT. Selection of DT must strike a balance between on one hand minimizing the risk of multiple transmissions within the cell and on the other hand minimizing the loss of transmission capacity due unnecessary deferment. The access point device 12 signals its discriminator circuit 23 to set its DT accordingly. As a result the access point device 12 will not start transmissions when strength discriminator 23 indicates reception of a signal with a strength above the DT.

Preferably access point device 12 averages the measured signal strengths of a plurality of signals from each of the various associated station devices 10, for each device over a predetermined period of for example thirty seconds. Thus a more reliable measurement is realized.

Preferably, as a third step, the access point device 12 sends information about the selected DT to the associated station devices 10 and the station devices 12 set their own DT to the level specified by that information. Thus, a single set of measurements by the access point device 12 suffices to set the DT of all of the associated station devices 12.

Preferably, the selection of DT is periodically repeated during normal operation with communication between the devices, e.g. once every minute. Thus, the DT can be adapted to addition or removal (switching on and switching off) of station devices 10 in the network, to movement of station devices within the cell and to switches when a station devices 10 changes the access point device 12 with which it is associated.

The CDT needs to be changed less frequently than the DT, or at least with a different frequency, because the CDT depends only on the active presence of access point stations 12. Preferably, however, selection and setting of the CDT is also repeated periodically, although possibly at a lower frequency than updating of the CDT. It will be appreciated that changes of the CDT are decoupled from changes of the DT, but that generally a change of DT is needed some time after a change in CDT, because a change of CDT implies a change in the region of space in which station devices 10 associated with an access point device 12 can be located and thereby in the station devices 10 that can associate with the access point device 12.

The invention claimed is:

1. A wireless communication network, the network comprising a plurality of spatially distributed communication devices, each for transmitting wireless signals carrying frames, each device being arranged to process frames from signals only when a strength of the signals exceeds a carrier detection threshold, each device being arranged to defer an intended transmission upon detection of a wireless signal with a strength greater than a defer threshold prior to the intended transmission, a subset of the devices being access point devices and a remainder of the device being station devices, each arranged to communicate with an own associated one of the access point devices, the network comprising:

a measuring circuit for performing a first measurement of a first signal strength of signals from access point devices and a second measurement of a second signal strength of signals from station devices associated with a first one of the access point devices;

a threshold adjustment circuit for first setting the carrier detection threshold of a first one of the access point devices above the first signal strength obtained from the first measurement, the second measurement being performed when said first setting has taken effect, the threshold adjustment circuit subsequently setting the defer threshold of the first one of the access point devices and/or one or more of the station devices associated with the first one of the access point devices below the second signal strength obtained from the second measurement.

2. A wireless communication network according to claim 1, wherein the measuring circuit is arranged to perform the first and second measurement at a location of the first one of the access point devices.

3. A wireless communication network according to claim 2, wherein the first one of the access point devices is arranged to transmit a result of the second measurement to associated ones of the station devices that are associated with the first one of the access point devices, at least one of these associated ones of the station devices comprising a part of the threshold adjustment circuit for setting the defer threshold according to the transmitted result.

4. A wireless communication network according to claim 1, wherein the measuring circuit and the threshold adjustment circuit are arranged to perform the second measurement and adjust the defer threshold periodically during operation of the network.

5. A wireless communication network according to claim 1, wherein the first measuring circuit is arranged to perform the first measurement only for the first signal strength of signals of a subset of the access point devices that normally use frequency channels at not more than a predetermined channel distance from a frequency channel normally used by the first one of the access point devices.

6. A wireless communication network according to claim 1, wherein the measuring circuit is arranged to determine the second signal strength by determining a minimum of measured signal strengths of the signals from station devices associated with the first one of the access point devices.

7. A wireless communication network according to claim 1, wherein the measuring circuit is arranged to determine the second signal strength by determining an average of measured signal strengths of the signals from station devices associated with the first one of the access point devices.

8. A method of operating a wireless communication network, the network comprising a plurality of spatially distributed communication devices, each for transmitting wireless signals carrying frames, each device being arranged to process frames from signals only when a strength of the signals exceeds a carrier detection threshold, each device being arranged to defer an intended transmission upon detection of a wireless signal with a strength greater than a defer threshold prior to the intended transmission, a subset of the devices being access point devices and a remainder of the devices being station devices, each of which is arranged to communicate with an own associated one of the access point devices, the method comprising the steps of:

first measuring a first signal strength of signals from access point devices first adjusting the carrier detection threshold of a first one of the access point devices above the first signal strength obtained from the first measurement, second measuring a second signal strength of signals from station devices associated with a first one of the access point devices, said second measuring being performed when said first adjusting has taken effect;

second adjusting the defer threshold of the first one of the access point devices and/or one or more of the station devices associated with the first one of the access point devices below the second signal strength obtained from the second measurement.

9. A method according to claim 8, wherein the second measuring step and the second adjustment step are periodically repeated during operation of the network.

10. An access point device arranged to operate as an access point device used in a wireless communication network having a plurality of spatially distributed communication devices, each for transmitting wireless signals carrying frames, each device being arranged to process frames from signals only when a strength of the signals exceeds a carrier detection threshold, each device being arranged to defer an intended transmission upon detection of a wireless signal with a strength greater than a defer threshold prior to the intended transmission, a subset of the devices being access point devices and a remainder of the devices being station devices, each of which is arranged to communicate with an own associated one of the access point devices, the network further comprising a measuring circuit for performing a first measurement of a first signal strength of signals from access point devices and a second measurement of a second signal strength of signals from station devices associated with a first one of the access point devices and a threshold adjustment circuit for first setting the carrier detection threshold of a first one of the access point devices above the first signal strength obtained from the first measurement, the second measurement being performed when said first setting has taken effect, the threshold adjustment circuit subsequently setting the defer threshold of the first one of the access point devices and/or one or more of the station devices associated with the first one of the access point devices below the second signal strength obtained from the second measurement;

said access point device being arranged to transmit a result of the second measurement to associated ones of the station devices that are associated with the access point device.

11. A station device arranged to operate as one of the station devices used in a wireless communication network having a plurality of spatially distributed communication devices, each for transmitting wireless signals carrying frames, each device being arranged to process frames from signals only when a strength of the signals exceeds a carrier detection threshold, each device being arranged to defer an intended transmission upon detection of a wireless signal with a strength greater than a defer threshold prior to the intended transmission, a subset of the devices being access point devices and a remainder of the devices being station devices, each of which is arranged to communicate with an own associated one of the access point devices, the network further comprising a measuring circuit for performing a first measurement of a first signal strength of signals from access point devices and a second measurement of a second signal strength of signals from station devices associated with a first one of the access point devices and a threshold adjustment circuit for first setting the carrier detection threshold of a first one of the access point devices above the first signal strength obtained from the first measurement, the second measurement being performed when said first setting has taken effect, the threshold adjustment circuit subsequently setting the defer threshold of the first one of the access point devices and/or one or more of the station devices associated with the first one of the access point devices below the second signal strength obtained from the second measurement;

said station device being arranged to receive information about a result of the second measurement from the access point device, the station device part of the threshold adjustment circuit for setting the defer threshold according to the received result.

* * * * *